April 5, 1966   C. HENRY   3,244,358
WHIP DEVICE
Filed July 6, 1964

INVENTOR.
COLONEL HENRY
BY
Meyers & Peterson
ATTORNEYS

United States Patent Office 3,244,358
Patented Apr. 5, 1966

3,244,358
WHIP DEVICE
Colonel Henry, Box 1, Lawton, Iowa
Filed July 6, 1964, Ser. No. 380,478
8 Claims. (Cl. 231—2)

The present application relates generally to an improved whip device for use by stockmen and the like, and more particularly to an improved whip of this type having good whipping characteristics and which is extremely rugged and durable.

Whip devices for use by cattlemen and stockmen normally employ an elongated flexible shaft with a handle at one end and a popper at the other end. The wave motion or lateral stresses which the operator sets up in the flexible shaft by motion of the handle is transmitted along the shaft, ultimately arriving at the free end where the popper element is located. The popper element attains an unusually high velocity and is frequently found to be transonic and in excess of sonic velocity, and this motion is manifested by the audible crack of the whip element. In the past, it has been the practice to cover the flexible shaft with a layer in the form of hollow flexible rawhide or other braided flexible material and then secure a popper to the free end of the braided rope. Still other whips have been prepared wherein the popper is secured to a loop formed in a linen or other tightly adherent coating disposed on a flexible shaft. In each case, conventional whips are subject to certain disadvantages. The rawhide whip, while attractive in appearance, is subject to rapid deterioration during use, the material not being sufficiently rugged to withstand rigorous use over an extended period of time. The linen braided covering is somewhat durable, however the end loop through which the popper is secured has not been found to be sufficiently strong to withstand the rigorous use to which it is put, the velocities reached by the popper at this point during use being quite high. It has been found, however, that a flexible shaft prepared from a molded glass fiber reinforced plastic material is exceptionally rugged and durable, easy to maintain in clean condition, and capable of long use. Thus, if a whip could be fabricated from reinforced plastic having a contour which would provide for the reception of the handle at one end, a flexible area along the extent of the shaft, for proper whip action, and a sufficiently durable area at the free end of the shaft for threading the popper therethrough, a whip having an exceptionally long life could accordingly be prepared. While reinforced plastic is the preferred material, other flexible materials such as steel or the like may be successfully employed.

Briefly, in accordance with the present invention, an improved whip comprising an elongated flexible reinforced plastic shaft having a handle receiving zone at one end, a relatively flexible intermediate zone, together with a relatively heavier popper receiving zone at the free end thereof. The handle is secured to one end of the shaft by means of a transverse pin which passes through both the handle and the shaft, and the popper is attached to the shaft by means of a diametrically disposed bore which passes through the shaft at the free end thereof. In order to provide for sufficient strength in the flexible shaft at the free end thereof, the diameter increases from the relatively thin flexible intermediate area to a relatively heavier free end area. Preferably, the thinnest portion of the shaft is disposed more closely adjacent to the free end than to the handle end, the relatively heavier portion of the shaft comprising less than about twenty percent of the length thereof. If desired, the shaft may be impregnated with a dye to provide a suitable color for the flexible shaft. Also, for aesthetic appeal, the handle may be provided with either a contrasting or similar color scheme.

Therefore, it is an object of the present invention to provide an improved whip for use by cattlement and stockmen which is extremely rugged, highly durable, and has a long life.

It is yet a further object of the present invention to provide an improved flexible reinforced plastic whip which is designed to have a maximum degree of flexibility, without sacrificing strength of the device.

Other and further objects of the present invention will become apparent to those skilled in the art upon the study of the following specification, accompanying drawings, and appended claims, wherein:

Figure 2:
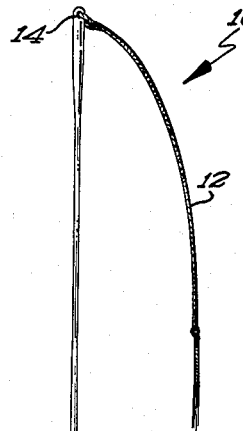
FIGURE 2 is a detail sectional view on a slightly enlarged scale showing the handle portion of the whip, a portion of the shaft being shown broken away.
Figure 2:
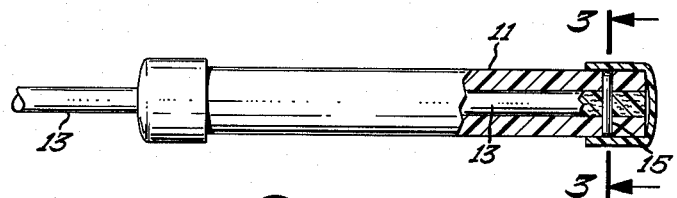
Figure 3:
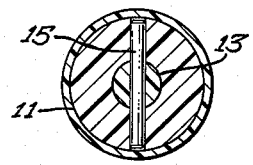
FIGURE 3 is a vertical sectional view taken along the line and in the direction of arrows 3—3 of FIGURE 2.
Figure 4:
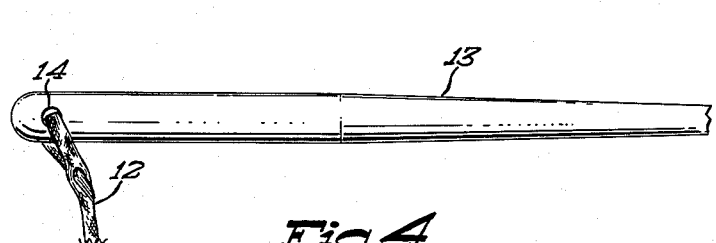
FIGURE 4 is a detail view on an enlarged scale of the free end tip of the shaft showing the flare area and the manner in which the popper is attached to the shaft, a portion of the shaft being shown broken away.
Figure 1:
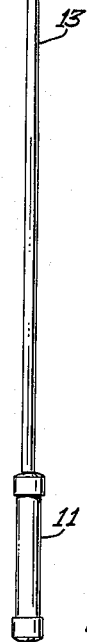
FIGURE 1 is a plan view of a whip device prepared in accordance with the present invention, the tapered zones being shown in exaggerated form.

In accordance with the preferred modification of the present invention, the whip shown in FIGURES 1–4 includes a cylindrical shaft member 10 which is preferably fabricated from glass reinforced fiber rod, the rod being a polyester resin filled with glass fibers or filaments. Cylindrical rods of this type are commercially available. The shaft 10 is provided with a handle 11 at one end thereof, and a popper 12 at the other end thereof. The intermediate portion 13 of the shaft 10 has a tapered contour which has a relatively large or maximum diameter at each of the end portions, and a minimum diameter along the central or intermediate portion thereof. In this connection, the relative ratios of diameter are about 2:1 for the end portions as compared to the narrow portions in the center thereof. For example, in a 60-inch whip, the handle portion and the free end portion of a reinforced plastic flexible shaft will have a diameter of about 0.310 inch, while the narrow length of the shaft will have a diameter of about 0.150 inch. In preparing such a shaft, the shaft tapers at a constant rate from a point adjacent the end of the handle until the narrow diameter is reached at an intermediate point about 15 inches from the free end of the shaft. This narrow diameter is continued for about a 10-inch segment, and the final 5-inch portion or segment has an increasing flared contour which reaches maximum diameter in 3 inches. The taper along the shaft is relatively constant and is gradual. In other words, no sharp break or shoulder areas are provided along the length of the shaft, and any transition in diameter being by way of a gradual taper. The shaft is bored at 14 in order to receive the popper 12 therethrough.

Normally, dependable whip action requires that the shaft of the whip be capable of being bent double, or substantially in the form of a closed loop. For a tapered shaft of the type described hereinabove, it is then requisite that the shaft be capable of being formed into a closed loop structure. For a normal 0.310 inch reinforced plastic shaft, a diameter of about 0.150 inch is necessary for a minimum of about 18 percent of the shaft. The relatively rigid free end or tip is preferably of greater mass per unit length than the center or reduced portion of the shaft. This provides a dual purpose of increasing the rigidity of this end portion to permit the attachment of a popper thereto as well as providing a greater mass to assist in the whipping and is accomplished by increasing the diameter of the shaft at the free end.

The end tip is rounded or balled in order that it does not present a sharp surface which could penetrate the hide or flesh of an animal and cause damage or injury.

In an unusually short riding whip having a length of about 24 inches, a 0.310 inch shaft may be utilized, however in this case, the narrow portion of the shaft is reduced in size to between 0.110 and 0.130 inch. This is sufficient to permit the shaft to be folded into a closed loop in order to provide appropriate whip action.

The proper element 12 comprises a braided nylon cord, preferably in the form of a hollow braided rope. Preferably, the shank portion of the popper is threaded through the bore in the flexible shaft and is then fastened to itself in order to form a closed loop in the area surrounding the bore.

The handle may be secured to the shaft by any suitable means. During use, a substantial amount of stress is provided between the handle and the shaft, and hence a firm snug fit is required. The most reliable mounting technique has been the use of the transverse pin 15 as shown in detail in FIGURE 2, however it has been found that a suitable adhesive may be employed to bond the handle onto the shaft. It is normally preferable that both an adhesive and pin 15 be employed.

It will, of course, be understood that various changes may be made in the form, details, arrangements and proportions of the parts without departing from the scope of my invention as set forth in the appended claims.

What is claimed is:

1. In a whip device comprising an integral flexible shaft having an axial rigidity sufficient to maintain an elongated configuration and flexibility sufficient to permit lateral resilient deflection in response to transverse stresses applied thereto, a handle secured to one end of the said flexible shaft and a popper element attached to the free end thereof, said flexible shaft being characterized in that the portion adjacent to the handle is relatively rigid, the diameter of said shaft initially decreasing along the length of the shaft and in a direction toward the free end thereof until a maximum degree of flexibility is attained at a point intermediate the handle and the free end, the diameter of said shaft then increases in said direction and until a substantially lesser degree of flexibility is attained at the point along the shaft adjacent to the free end thereof.

2. The whip device as defined in claim 1 being particularly characterized in that the mass per unit length of the flexible shaft is substantially greater at the free end than along the said intermediate length.

3. The whip device as defined in claim 1 wherein said shaft has a transverse bore near the free end thereof, said popper having a portion thereof passing through a said transverse bore to secure said popper to said flexible shaft.

4. The whip device as defined in claim 3 being particularly characterized in that said transverse bore is a diametric bore.

5. In a whip device comprising an integral flexible shaft having axial rigidity sufficient to maintain an elongated configuration, and flexibility sufficient to permit lateral resilient deflection in response to transverse stresses applied thereto, a handle secured to one end of said flexible shaft, and a popper element attached to the free end thereof, said flexible shaft being characterized in that the portion adjacent to the handle is relatively rigid, the diameter of said shaft initially decreasing along the length of the shaft and in a direction toward the free end thereof until a maximum degree of flexibility is attained at a point intermediate the handle and the free end, the diameter of said shaft then increasing in said direction and until a substantially lesser degree of flexibility is attained at the point along the shaft adjacent to the free end thereof, said shaft being capable of being bent into a closed loop configuration.

6. The whip device as defined in claim 5 being particularly characterized in that said elongated flexible shaft is comprised of glass fiber reinforced plastic material.

7. The whip device as defined in claim 5 being particularly characterized in that at least about 18 percent of the axial length of said flexible shaft has a maximum degree of flexibility.

8. A whip device comprising an integral elongated flexible shaft, a handle at one end of said shaft, and a popper element at the other free end of said shaft, the diameter of said shaft being at a maximum at the handle end of said shaft, decreasing uniformly toward the free end of said shaft to a minimum diameter at a predetermined distance from said handle end, continuing at said minimum diameter for a predetermined distance, then increasing uniformly toward the free end of said shaft back to said maximum diameter, and then continuing to the free end of said shaft at said maximum diameter, said shaft having a transverse bore extending therethrough near the free end thereof, said popper element having a portion thereof passing through said transverse bore to secure said popper element to said shaft.

References Cited by the Examiner

UNITED STATES PATENTS

| 511,816 | 1/1894 | Steimer et al. | 231—2 |
| 2,136,480 | 6/1964 | O'Neill | 231—2 |

SAMUEL KOREN, *Primary Examiner.*

HUGH R. CHAMBLEE, *Examiner.*